3,301,652
3,4-DIHALO-N-ACYLPHENYLHYDROXYLAMINES AS POST-EMERGENCE HERBICIDES
Jerome Linder, Niagara Falls, and Edward D. Weil, Lewiston, N.Y., assignors to Hooker Chemical Corporation, Niagara Falls, N.Y., a corporation of New York
No Drawing. Filed June 11, 1965, Ser. No. 463,353
13 Claims. (Cl. 71—2.3)

This application is a continuation-in-part of our copending application Serial No. 103,266, filed April 17, 1961, now United States Patent No. 3,253,021.

This invention is of novel herbicidal compositions and uses. More particularly, the invention relates to herbicidal compositions based on the 3,4-dihalo-N-acylphenylhydroxylamines, alternatively called the N-(3,4-dihalophenyl)-acylhydroxamino acids, which have been described in our aforementioned patent. It also relates to herbicidal uses of such compounds.

The compounds referred to are:

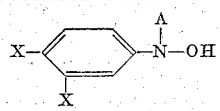

where A is an organic radical selected from aliphatic acyl radicals having three to six carbon atoms and having at least one methyl group in the alpha position, and X is a halogen, preferably chlorine. The aliphatic acyl radicals are preferably alkanoyl or alkenoyl of three to six carbon atoms, derived from an aliphatic carboxylic acid.

Illustrative of such compounds are:

3,4-dichloro-N-propionylphenylhydroxylamine,
3,4-dibromo-N-propionylphenylhydroxylamine,
3,4-dichloro-N-isobutyrylphenylhydroxylamine,
3,4-dibromo-N-isobutyrylphenylhydroxylamine,
3,4-dichloro-N-methacrylylphenylhydroxylamine,
3,4-dibromo-N-methacrylylphenylhydroxylamine,
3,4-dichloro-N-(2-methylbutanoyl)phenylhydroxylamine
and 3,4-dichloro-N-(2-methylpentanoyl)-phenylhydroxylamine.

A problem upon which a great deal of time and effort has been unsuccessfully expended is to find a selective herbicide capable of controlling weeds post emergently in broadleaf (dicotyledonous) crops such as cabbage, cotton, soybeans, potatoes, tomatoes and carrots, without harming the crops themselves. Initially, it was hoped that 2,4-dichlorophenoxyacetic acid (2,4-D), a selective post-emergent herbicide against weeds in grassy (monocotyledonous) crops would prove to be satisfactory, but due to 2,4-D's relatively high phytotoxicity to broadleaf crops this has rarely been possible. Even with certain grassy crops, such as rice, 2,4-D has been unsatisfactory, since it fails to control the major grassy weeds. Some good results have been obtained using herbicides in oil where broadleaf crops such as carrots are involved, which are resistant to herbicides, but the ordinary broadleaf crop is too severely damaged and many farmers have resigned themselves to the safe but more time consuming, tedious and expensive hand weeding and mechanical cultivating.

Thus, the discovery of a novel selective herbicide series of compounds possessing high phytotoxicity toward weeds after emergence and low phytotoxicity against broadleaf crops and certain grassy crops offer the advantage of dispensing with the more expensive laborious hand and machine cultivating and at the same time produces higher yields of the sought crop.

While selectivity and low phytotoxicity toward broadleaf crops are importatnt attributes possessed by the present compositions, there are equally important additional advantages, some of which will be disclosed for the sake of illustration.

An additional advantage of the compounds utilized in the present invention is that they have sufficient selectivity when used at the preferred rates, to control weedy grasses such as crabgrass and barnyard grass post-emergently in the presence of certain desirable grasses, such as bluegrass, ryegrass and other turf grasses, as well as rice and sugar cane, without serious damage to these crops.

Yet another advantage of the compositions of this invention is that the active ingredients therein may be used in grades of purity ranging from crystalline to technical crude. Furthermore, these herbicides offer the advantage of compatability with a host of other herbicides, including the herbicidal oils, with fungicides such as the metal dimethyl dithiocarbamates and ethylenebis-(dithiocarbamates), with insecticides such as benzene hexachloride and chlordane, with fertilizers such as urea and ammonium nitrate, and various adjuvants and diluents well known to the art. Thus, these herbicides may be used by themselves or made the subject of liquid or solid formulations ranging from the very simple to the very complex, wherein they are present in a phytotoxic concentration. For example, if it is desired, the herbicides may be made the subject of a liquid formulation by diluting, dispersing, dissolving or emulsifying in a liquid carrier containing a surface actve or dispersing or emulsfyng adjuvant or a combination of these adjuvants in water or organic solvents, such as petroleum hydrocarbons, alcohols, ketones, esters, glycols, or combinations thereof. Alternatively, the novel herbicides may be made up as solid formulations of powders, dusts, wettable dusts, granules and pellets, using solid diluents, such as talcs, clays, flours, starches, diatomaceous earths, mica, alkaline earth metal carbonates and phosphates either finely divided, granular or pelleted in form. These solid and liquid formulations facilitate handling and application and sometimes enhance herbicidal activity to more than an additive degree.

The liquid compositions, whether solutions or dispersions of the active agents in a liquid solvent and also the wettable powder or dust compositions of this invention may contain as a conditioning agent one or more surface-active agents in proportions sufficient to render the composition readily dispersible in water. Within the term "surface active agents" are included wetting agents, dispersing agents, emulsifying agents and the like. A satisfactory but not complete list of such agents is set forth in an article in "Soap and Chemical Specialties," vol. 31, No. 7, pages 50–61; No. 8, pages 48–61; No. 9, pages 52–67; and No. 10, pages 38 (67) 1955. Other sources of adjuvant materials are set forth in Bulletin E–607 of the Bureau of Entomology and Plant Quarantine of the United States Department of Agriculture.

Although the manner and method of application of the invented compositions is varied and largely dependent upon the climatic conditions, crop treated, the weeds to be eradicated, the equipment available and the convenience of the user, a preferred embodiment of this invention is to apply these herbicides as a spray after making them up as a liquid formulation comprised of several times their weight of non-phytotoxic solvent, such as xylene, with small quantities of emulsifiers such as the commercial polyoxyethylene ethers and the alkylaryl sulfonates. Such a mixture is emulsified with water and sprayed on the weeds growing amidst the desired crop, such as soybeans, cabbage, potatoes, tomatoes, rice, carrots or turf grasses.

The rate of application cannot be precisely stated due to varying degree of resistance possessed by the weed species and crop, the stage of weed and crop growth, the soil type and climatic conditions, but, in general, the rates will be at least one-quarter of a pound of herbicide per acre and for reasons of cost will seldom exceed forty pounds per acre with the preferred range falling within one-half to ten pounds per acre. Where the weeds are in an early stage of growth, and consequently are more susceptible, they will frequently respond to the rates from one-half to four pounds per acre, while older weeds or weeds that are to be totally eradicated from ornamental beds or turf may require rates in excess of twenty pounds per acre. In compositions comprising from 0.5 to 95 percent by weight of active herbicide, with the balance being solvent (including water), or solid carrier formulation adjuvant and/or surface-active agent, the quantities employed are from ½ to 8,000 pounds per acre, preferably from 1 to 800 pounds per acre. Usually the portion of surface-active agent will not exceed that of active herbicide.

The present herbicidal compounds may conveniently be prepared by treating 3,4-dichlorophenylhydroxylamine or its salts, which are well known compounds, with one mole or less of an acylating agent represented by propionyl, isobutyryl, methacryl or a mixture thereof. Suitable acylating agents include the acyl halides, anhydrides or the generally slower reacting esters. Although catalysts are not essential to the success of the preparative reaction, where the acylating agent is the halide or the anhydride, the presence of an acid acceptor such as a tertiary amine or inorganic base is helpful in speeding up the reaction and insuring that the reaction goes to completion. The free OH group imparts a slight acidity to the compositions which enables the preparation of the metal salts by reaction with a strong base. Typical salts which may be produced by this method are the alkali and alkaline earth metal salts as well as the ammonium and substituted ammonium salts. These salts are useful as convenient means for formulating the herbicidal compounds, as well as imparting special characteristics such as time of herbicidal duration, solubility and the like.

In order better to illustrate the workings of this invention, the following examples are given. These examples illustrate the preparation of some of the herbicidal compounds, formulations, uses and the testing procedure employed to evaluate the compositions as herbicides.

*Example 1.—Preparation of 3,4 dichloro-N-propionylphenylhydroxylamine*

In an appropriate reaction flask is placed a solution consisting of one mole of 3,4-dichlorophenylhydroxylamine and one mole of triethylamine in six hundred milliliters of dry benzene. The solution is cooled to fifteen degrees centigrade and nitrogen under positive pressure is applied to the reactor. To this solution is added slightly less than one mole of propionyl chloride at a sufficient rate so that the reaction temperature does not rise above twenty degrees centigrade. The reaction mixture is stirred for an additional two hours and filtered. The filter cake is washed with benzene and discarded. The filtrate is washed with dilute hydrochloric acid, water, sodium bicarbonate and water, in the order given, then dried. The benzene is evaporated, leaving an oil which is dissolved in hexane and the insoluble material is removed by filtration. After evaporation of the hexane, an almost quantitative yield of a solid is obtained. Upon crystallization, the product melts at one hundred and thirty to one hundred and thirty-one degrees centigrade. Elemental analysis: Theory—Cl, 30.3 percent; N, 6.0 percent; found—Cl, 30.2 percent; N, 5.8 percent.

Infra-red analysis establishes the identity of the product as 3,4-dichloro-N-propionylphenylhydroxylamine.

*Example 2.—Preparation of 3,4-dichloro-N-isobutyrylphenylhydroxylamine*

Using the same procedure and reaction conditions described in detail in Example 1, but with isobutyryl chloride instead of propionyl chloride, the above-named solid product melting at one hundred and twelve degrees centigrade is formed in good yield. Elemental analysis: Theory—Cl, 28.6 percent; N, 5.7 percent; found—Cl, 28.7 percent; N, 5.3 percent.

Infra-red analysis establishes that 3,4-dichloro-N-isobutyrylphenylhydroxylamine, the desired product, is formed.

*Example 3.—Preparation of 3,4-dichloro-N-methacrylylphenylhydroxylamine*

Using the same procedure and reaction conditions described in Example 1, but with methacrylyl chloride instead of propionyl chloride, the above-named product is formed in good yield. The product is a solid melting at one hundred and six degrees centigrade, having the following elemental analysis: Theory—Cl, 28.9 percent; N, 5.7 percent; found—Cl, 28.9 percent; N, 5.7 percent.

*Example 4.—Herbicidal evaluations*

Greenhouse tests of herbicidal activity are performed at an application rate of four pounds of active ingredient per acre, as follows. The compound is dissolved in several parts by weight of a substantially non-phytotoxic mixture of xylene or isophorone and a commercial polyoxyethylene-alkylaryl sulfonate mixture and the solution emulsified with water and sprayed on a population of seedlings of representative annual weeds, principally ragweed, lamb's-quarters and buttonweed, generally at one to three weeks after emergence. The ratings of weed kill are given in the last column of the table labeled "Herbicidal Activity," and are scaled from 0–10, 0 being no effect, and 10 being one hundred percent kill, the intermediate ratings being based on visual estimates of percentage kill of weeds. A rating under 7 is considered to be unsatisfactory. The results are given in the table below. Seedling ryegrass under these same test conditions was not seriously injured.

TABLE I

| Compound: | Herbicidal activity rating |
|---|---|
| 3,4-dichloro-N-propionylphenylhydroxylamine | 10 |
| 3,4-dichloro-N-isobutyrylphenylhydroxylamine | 9–10 |
| 3,4-dichloro-N-methacrylylphenylhydroxylamine | 7–8 |
| 3,4-dichlorophenylhydroxylamine | 0 |
| 4-chloro-N-acetylphenylhydroxylamine | 0–2 |
| 3,4-dichloro-N-acetylphenylhydroxylamine | 0 |
| 3,4-dichloro-N-octanoylphenylhydroxylamine | 0 |
| 3,4-dichloro-N-acrylylphenylhydroxylamine | 0 |
| 3,4-dimethyl-N-propionylphenylhydroxylamine | 0 |

*Example 5.—Evaluation of herbicidal selectivity*

Using the same techniques and conditions, concentrations (four pounds per acre), and rating system, given in Example 4, the described compounds are tested in an area in which soybeans, cabbages, potatoes and tomatoes are growing. The compounds are rated in two respects, first as to the weed kill and the second as to injury to the foliage of the crop.

TABLE II

| Compound | Herbicidal Activity | Damage to Vegetable Crops |
|---|---|---|
| 3,4-dichloro-N-propionylphenyl-hydroxylamine. | 10 | No significant damage. |
| 3,4-dichloro-N-isobutyrylphenyl-hydroxylamine. | 8–10 | Do. |
| 3,4-dichloro-N-methacrylylphenyl-hydroxylamine. | 7–8 | Do. |
| 3,4-dichloro-N-(2-methylpantanoyl)-phenylhydroxylamine. | 7 | Do. |

While all of the preparations of this invention are effective herbicides, for reasons of economy and convenience among other things, compositions comprising the 3,4-dichloro-N-propionyl, N-isobutyryl, and N-methacrylyl-phenylhydroxylamines are more advantageous and are therefore the preferred embodiments of this invention.

What is claimed is:

1. A method for the control of weeds comprising applying to said weeds a phytotoxic amount of a 3,4-dihalo-N-acylphenylhydroxylamine of the structure:

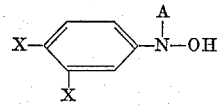

wherein X is a halogen selected from the group of chlorine and bromine and A is an aliphatic acyl radical selected from the group consisting of alkanoyl and alkenoyl of three to six carbon atoms, having at least one methyl group on the carbon atom adjacent to the carbonyl group.

2. The method of claim 1 wherein the compound applied is 3,4-dichloro-N-propionylphenylhydroxylamine.

3. The method of claim 1 wherein the compound applied is 3,4-dichloro-N-isobutyrylphenylhydroxylamine.

4. The method of claim 1 wherein the compound applied is 3,4-dichloro-N-methacrylylphenylhydroxylamine.

5. A herbicidal composition of matter comprising a phytotoxic concentration of 3,4-dihalo-N-acylphenylhydroxylamine of the structure:

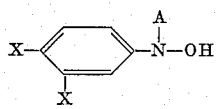

wherein X is a halogen selected from the group consisting of chlorine and bromine and A is an aliphatic acyl radical selected from the group consisting of alkanoyl and alkenoyl of three to six carbon atoms, having at least one methyl group on the carbon atom adjacent to the carbonyl group and a solvent formulation adjuvant.

6. A herbicidal composition of matter comprising a phytotoxic concentration of 3,4-dihalo-N-acylphenylhydroxylamine of the structure:

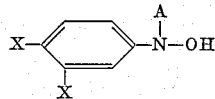

wherein X is a halogen selected from the group consisting of chlorine and bromine and A is an aliphatic acyl radical selected from the group consisting of alkanoyl and alkenoyl of three to six carbon atoms, having at least one methyl group on the carbon atom adjacent to the carbonyl group, and a solid carrier formulation adjuvant.

7. A herbicidal composition of matter comprising a phytotoxic concentration of 3,4-dihalo-N-acylphenylhydroxylamine of the structure:

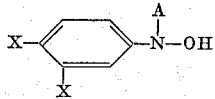

wherein X is a halogen selected from the group consisting of chlorine and bromine and A is an aliphatic acyl radical selected from the group consisting of alkanoyl and alkenoyl of three to six carbon atoms, having at least one methyl group on the carbon atom adjacent to the carbonyl group, and a surface active agent formulation adjuvant.

8. A herbicidal composition according to claim 5 in which the solvent is selected from the group consisting of petroleum hydrocarbons, alcohols, ketones, esters, glycols and combinations thereof.

9. A herbicidal composition according to claim 6 in which the solid carrier is selected from the group consisting of talc, clay, diatomaceous earth, mica, carbonates, phosphates, flours and starches.

10. A herbicidal composition according to claim 7 in which the surface active agent is selected from the group consisting of polyoxyethylene ether and alkylaryl sulfonate surface active compounds.

11. A herbicidal composition comprising a phytotoxic concentration of 3,4-dihalo-N-acylphenylhydroxylamine of the structure:

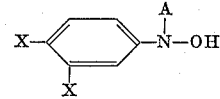

wherein X is a halogen selected from the group consisting of chlorine and bromine and A is an aliphatic acyl radical selected from the group consisting of alkanoyl and alkenoyl radicals having from three to six carbon atoms and having at least one methyl group on the carbon atom adjacent to the carbonyl group, and formulation adjuvants comprising xylene, isophorone, mixed polyoxyethylene-alkylaryl sulfonate surface active agent and water, in emulsion form.

12. A method for the control of weeds comprising applying to said weeds a phytotoxic amount of a 3,4-dihalo-N-acylphenylhydroxylamine of the structure:

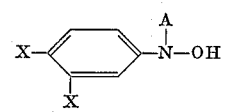

wherein X is chlorine and A is an aliphatic acyl radical selected from the group consisting of alkanoyl and alkenoyl of three to six carbon atoms and having at least one methyl group on the carbon atom adjacent to the carbonyl group.

13. A method for the control of weeds comprising applying to said weeds a phytotoxic amount of a 3,4-dihalo-N-acylphenylhydroxylamine of the structure:

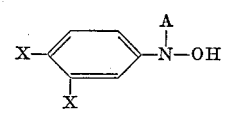

wherein X is chlorine and A is an aliphatic acyl radical selected from the group consisting of alkanoyl and alkenoyl of three to six carbon atoms and having one methyl group on the carbon atom adjacent to the carbonyl group.

References Cited by the Examiner

UNITED STATES PATENTS 3,037,058   5/1962   Bluestone et al. ____ 167—42 X
3,165,392   1/1965   Koopman _____ 71—213

OTHER REFERENCES

German printed application 1,005,784, April 1957.
German printed application 1,039,779, September 1958.
Chemical Abstracts, vol. 40, col. 7047(7) (1946).

LEWIS GOTTS, *Primary Examiner.*

JAMES O. THOMAS, JR., JULIAN S. LEVITT,
*Assistant Examiners.*